US008094569B2

(12) United States Patent
Gunukula et al.

(10) Patent No.: US 8,094,569 B2
(45) Date of Patent: Jan. 10, 2012

(54) FAILOVER AND FAILBACK OF COMMUNICATION BETWEEN A ROUTER AND A NETWORK SWITCH

(75) Inventors: Naveen Gunukula, Sunnyvale, CA (US); Jeslin Puthenparambil, San Jose, CA (US); Son Nguyen, San Jose, CA (US); Byung Lim, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 132 days.

(21) Appl. No.: 12/329,115

(22) Filed: Dec. 5, 2008

(65) Prior Publication Data

US 2010/0142368 A1 Jun. 10, 2010

(51) Int. Cl.
*H04J 3/14* (2006.01)

(52) U.S. Cl. ........................................ 370/242; 370/248

(58) Field of Classification Search .................. 370/217, 370/218, 219, 220, 221, 241, 241.1, 242, 370/244, 248

See application file for complete search history.

(56) References Cited

U.S. PATENT DOCUMENTS

| 6,012,150 | A | 1/2000 | Bartfai et al. | |
|---|---|---|---|---|
| 6,108,300 | A | 8/2000 | Coile et al. | |
| 6,229,787 | B1 | 5/2001 | Byrne | |
| 6,535,991 | B1 * | 3/2003 | Gallant et al. | 714/4 |
| 6,625,256 | B1 | 9/2003 | Tasker et al. | |
| 6,944,786 | B2 | 9/2005 | Kashyap | |
| 7,010,607 | B1 | 3/2006 | Bunton | |
| 7,010,715 | B2 | 3/2006 | Barbas et al. | |
| 7,016,299 | B2 | 3/2006 | Kashyap | |
| 7,079,551 | B2 * | 7/2006 | Shivnan | 370/469 |
| 7,096,383 | B2 | 8/2006 | Talaugon et al. | |
| 7,409,566 | B1 * | 8/2008 | Diab | 713/310 |
| 7,529,182 | B2 | 5/2009 | Homma | |
| 2002/0172148 | A1 * | 11/2002 | Kim et al. | 370/216 |
| 2004/0107382 | A1 | 6/2004 | Doverspike | |
| 2004/0223451 | A1 | 11/2004 | Homma | |
| 2005/0058063 | A1 * | 3/2005 | Masuyama et al. | 370/217 |
| 2006/0053231 | A1 * | 3/2006 | Lange et al. | 709/239 |

(Continued)

FOREIGN PATENT DOCUMENTS

DE    60134579 D1    8/2008

(Continued)

OTHER PUBLICATIONS

International Search Report dated Jun. 21, 2010 in PCT Application No. PCT/US2009/066550.

*Primary Examiner* — Kwang B Yao
*Assistant Examiner* — Juvena Loo
(74) *Attorney, Agent, or Firm* — Brinks Hofer Gilson & Lione

(57) ABSTRACT

A router is provided. The router includes a primary interface, a backup interface, a processor, and a memory. The primary interface and backup interface may be used to communicate with a network switch. The router may be configured to determine whether the primary interface is stable. The primary interface is stable when the primary interface may be used to exchange information with a network switch over a primary network segment. The router may be configured to activate the primary interface when the primary interface is determined to be stable. The router may also be configured to activate the backup interface when the primary interface is determined to be not stable. The backup interface may be activated for the exchange of information with the network switch.

19 Claims, 9 Drawing Sheets

U.S. PATENT DOCUMENTS

| | | |
|---|---|---|
| 2006/0206602 A1 | 9/2006 | Hunter |
| 2007/0165520 A1 | 7/2007 | Messing et al. |
| 2007/0253326 A1* | 11/2007 | Saha et al. .................. 370/217 |
| 2008/0068985 A1 | 3/2008 | Mieno |
| 2008/0137532 A1 | 6/2008 | Namburi |
| 2008/0152341 A1* | 6/2008 | Hung et al. ..................... 398/2 |
| 2008/0166122 A1 | 7/2008 | Hsiao |
| 2008/0215910 A1* | 9/2008 | Gabriel et al. .................. 714/4 |
| 2008/0273456 A1 | 11/2008 | Messing |

FOREIGN PATENT DOCUMENTS

| | | |
|---|---|---|
| EP | 1414193 A1 | 6/2008 |
| JP | 2008-078893 A1 | 4/2008 |
| WO | WO 03-015351 A1 | 2/2003 |

* cited by examiner

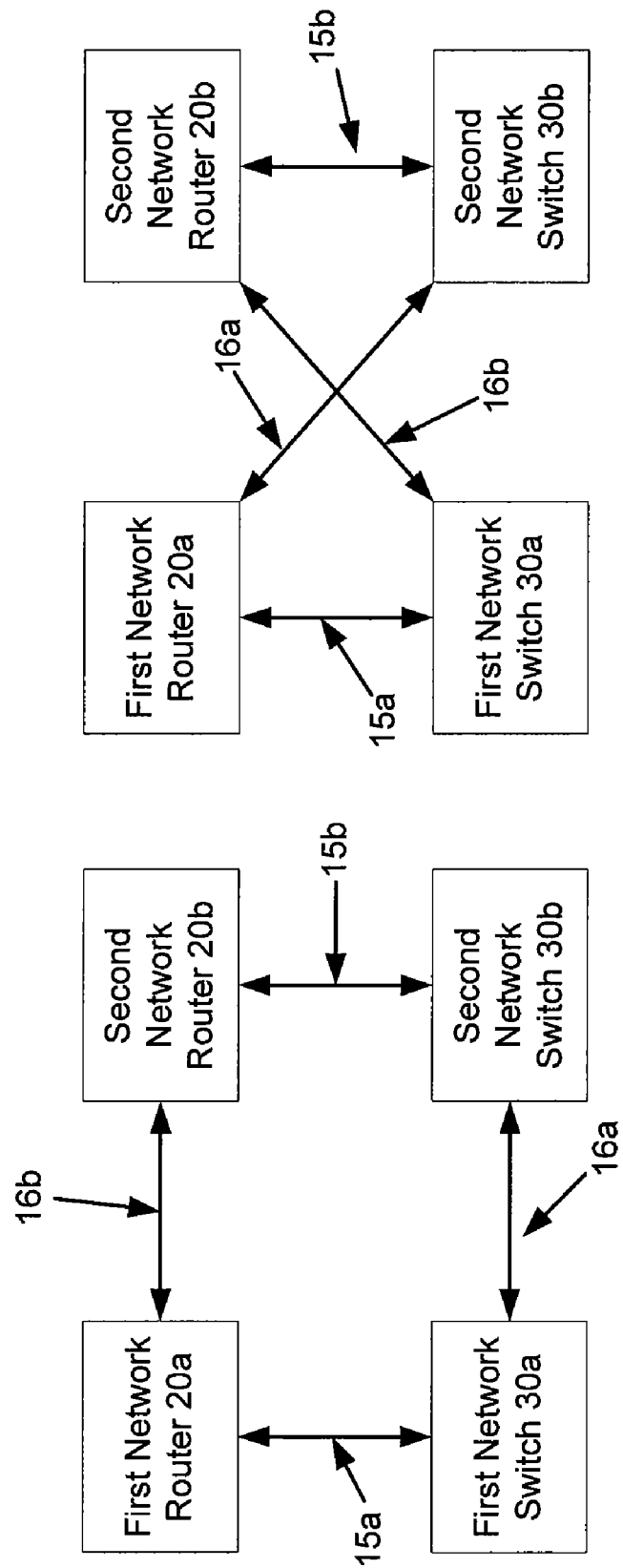

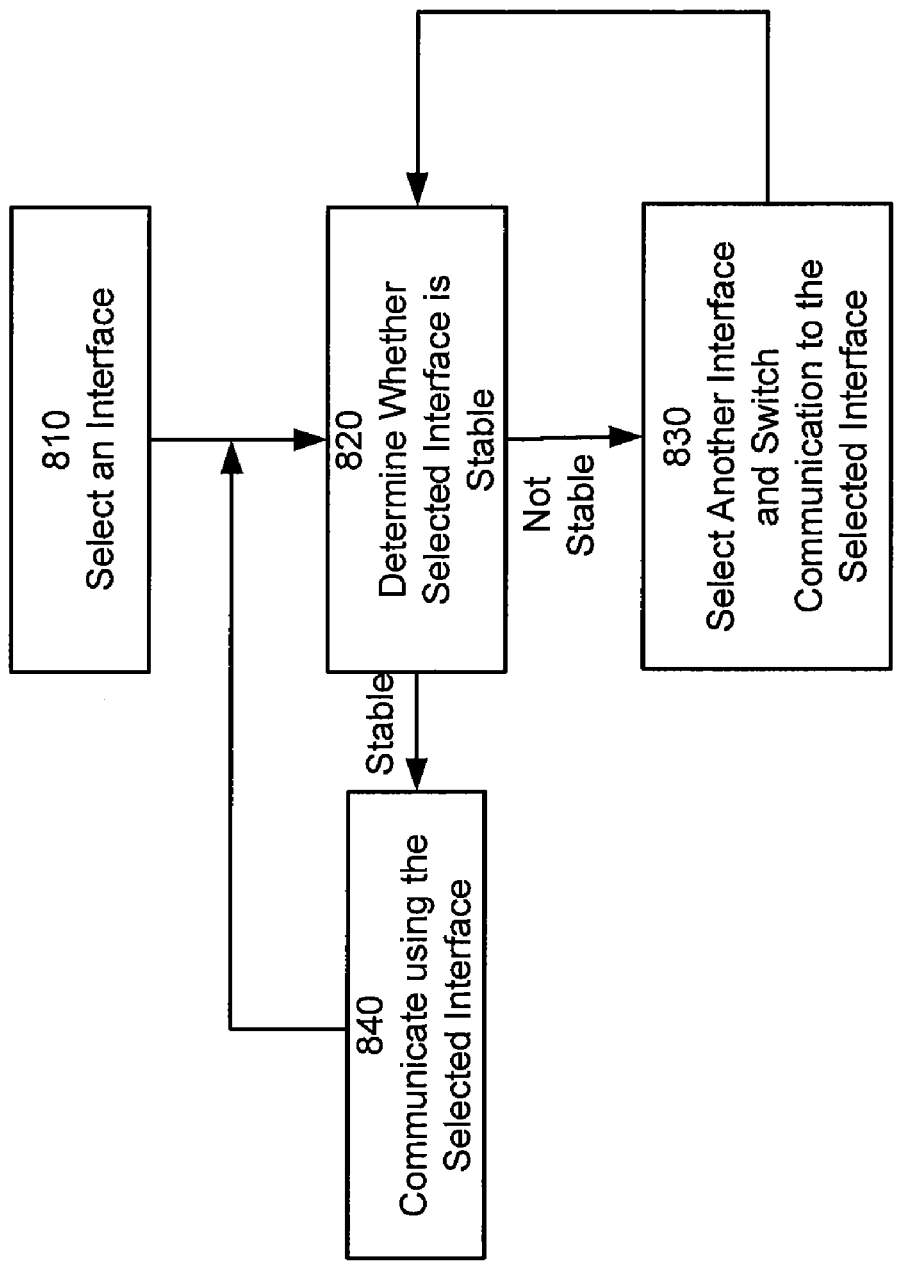

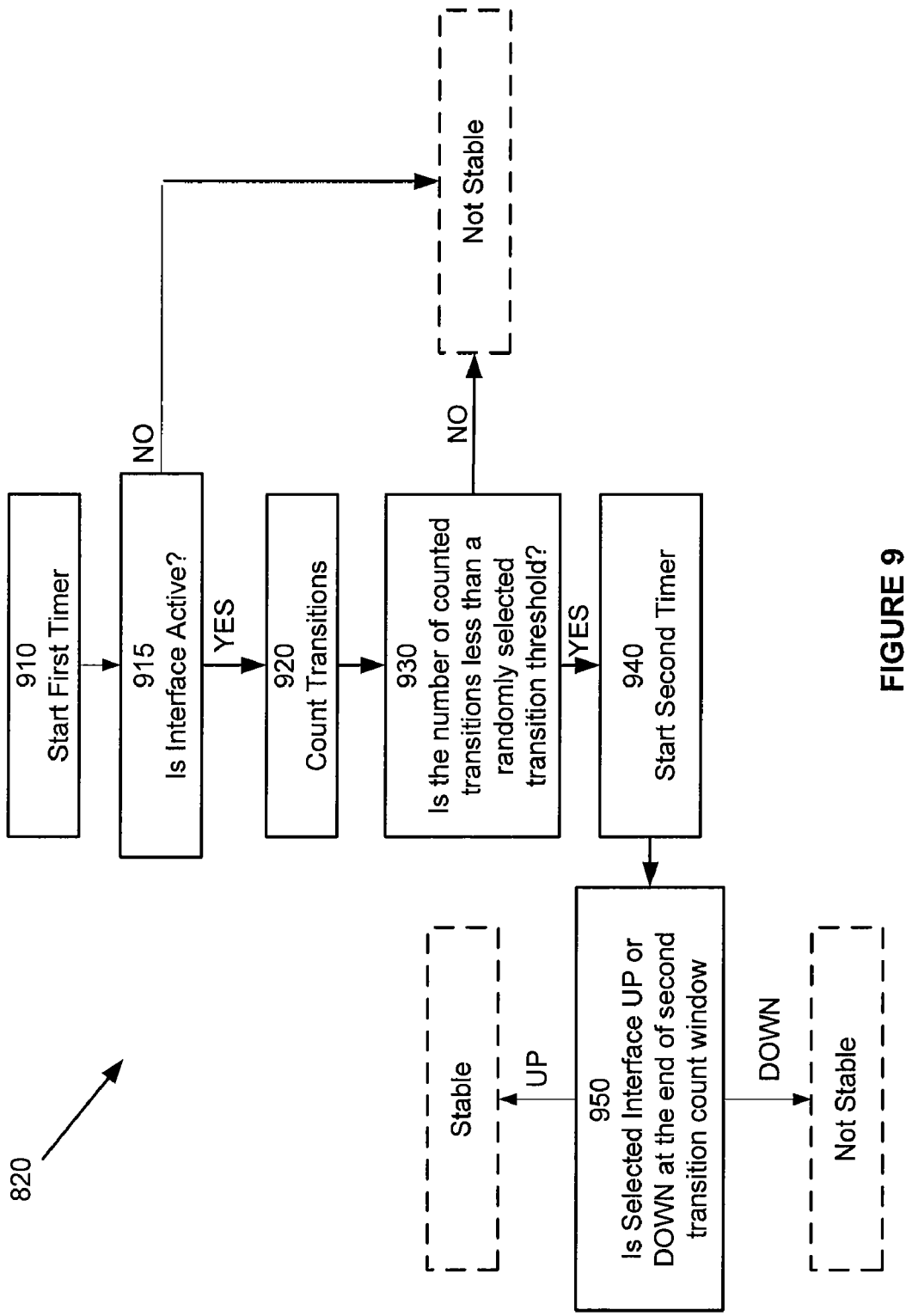

FAILOVER AND FAILBACK OF COMMUNICATION BETWEEN A ROUTER AND A NETWORK SWITCH

FIELD OF TECHNOLOGY

The present embodiments relate to communication between a router and a network switch in a communication network. More specifically, the present embodiments may relate to failover and failback of communication between a router and a network switch.

BACKGROUND

Communication networks may include network switches. A network switch connects a communication device with a network router or other communication device. A transmission line, such as a copper cable or an optical fiber, may be used to transmit data between the network switch and the network router. The transmission line may be coupled with an interface of the network router. The interface may become inactive, for example, when the transmission line is disconnected from the network router or network switch. When the interface is inactive, the network switch is unable to communicate with the network router. Accordingly, the communication device, which uses the network switch to communicate with the network router, is unable to communicate with the network router or the other networks connected to the network router.

BRIEF DESCRIPTION OF THE DRAWINGS

FIGS. 7A and 7B illustrate embodiments of backup communication;

FIG. 8 illustrates one embodiment of a method for communication between a network switch and a network router; and FIG. 9 illustrates one embodiment of a method for automatically determining whether a selected interface is stable.

DETAILED DESCRIPTION

Figure 1:
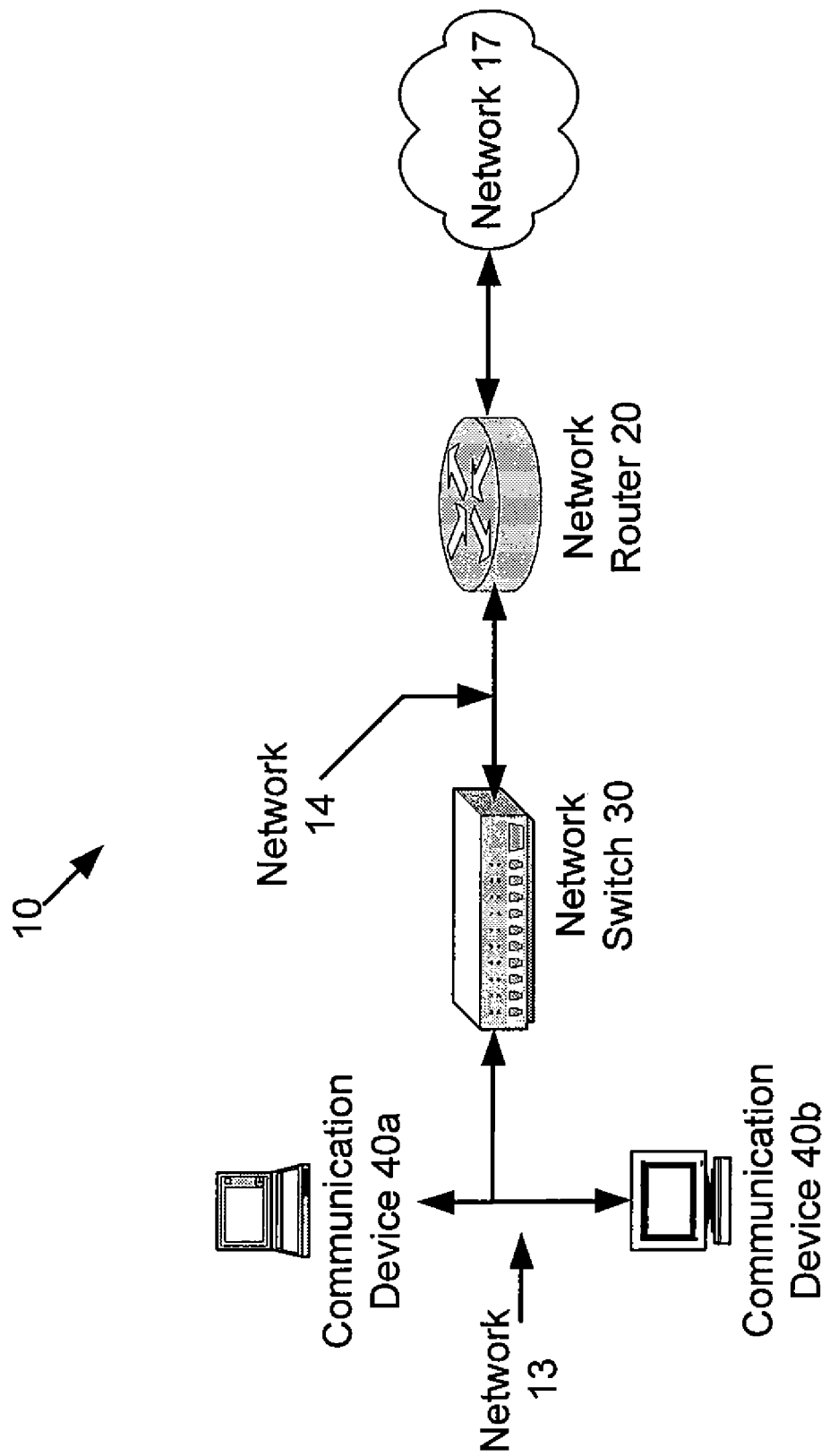
FIG. 1 illustrates one embodiment of a communication network.

The present embodiments relate to failover and failback of communication between a network router and a network switch. Failover includes moving the communication from a primary network to a backup network, so that the network router and network switch may communicate when a primary interface is inactive or flapping, for example, when the primary interface is not stable. Failback includes returning the communication back to the primary network from the backup network when the primary interface is active, for example, when the primary interface is stable. As used herein, communication includes the exchange of information, such as a message, data, or a signal. Flapping occurs when the energy status of the selected interface changes too often in a relatively short time.

In one aspect, a router includes a primary interface, a backup interface, a processor, and a memory. The primary interface is operable to communicate with a network switch over a primary network segment. The backup interface is operable to communicate with the network switch over a backup network segment. The primary interface and the backup interface may be coupled with the processor. The memory may be in communication with the processor. The memory may include computer code executable with the processor. The computer code may be configured to determine whether the primary interface is stable, the primary interface being stable when the primary interface may be used to exchange information with a network switch over the primary network. The computer code may be configured to activate the primary interface when the primary interface is determined to be stable. The primary interface may be activated for the exchange of information with the network switch over the backup network segment. The computer code may also be configured to activate the backup interface when the primary interface is determined to be not stable. The backup interface may be activated for the exchange of information with the network switch.

In a second aspect, a method is provided for selecting a first router interface for communication with a network switch. The selected first router interface is operable to communicate with the network switch using a first communication channel. The method may include determining whether the selected first router interface is stable, using the selected first router interface to communicate with the network switch when the selected first router interface is stable, and determining whether a second router interface is stable when the selected first router interface is not stable. Communication is moved to a second router interface when the second router interface is stable.

In a third aspect, a method includes selecting a first router interface for communication with a network switch. The selected first router interface is operable to communicate with the network switch using a first communication channel. A first number of transitions on the selected first router interface are counted. The number of transitions is counted during a first transition count window. A router determines whether the selected first router interface is stable based on the number of transitions. Communication with the network switch is moved to a second router interface when the selected first router interface is not stable. The second router interface is operable to communicate with the network switch using a second communication channel.

FIG. 1 illustrates a communication network 10. The communication network 10 includes a network router 20, a network switch 30, and one or more communication devices 40a, 40b. The network switch 30 is coupled with or may be coupled with the one or more communication devices 40a, 40b through network 13. The network switch 30 is coupled with or may be coupled with the network router 20 through network 14. The network router 20 may be coupled with other communication devices, such as routers, switches, and servers, through network 17. The phrase "coupled with" includes directly connected to or indirectly connected through one or more intermediate components. Such intermediate components may include hardware and/or software based components. In alternative embodiments, the communication network 10 includes additional, fewer, or different components.

The communication network 10 is a local area network (LAN), personal area network (PAN), wide area network (WAN), global area network (GAN), Campus Area Network (CAN), intranet network, extranet network, or other system used for communication. For example, the communication network 10 is a system for ensuring that messages are transmitted between the router 20 and the network switch 30. Within the router 20, communication may be automatically or manually moved from a primary interface to a backup interface, for example, when the primary interface is not stable. The communication may be automatically or manually moved back to the primary interface when the primary interface is stable. In another example, the communication network 10 may automatically select the primary interface or the backup interface and move communication to the selected interface based on which interface is stable and/or preferred.

In one illustration, which will be referred to as "the illustration above," a business may use a communication network 10 according to the present embodiments. The business may employ a bookkeeper, Bill, and a marketer, Mary. Bill uses a laptop computer, which is connected to a network switch 30. Mary uses a desktop computer, which is also connected to the network switch 30. A communication channel couples the network switch 30 with a network router 20, which is connected to the Internet. The communication channel may include a primary transmission line and a backup transmission line. The primary transmission line may be connected to a primary interface of the network router 20, and the backup transmission line may be connected to a backup interface of the network router 20. When the primary interface is not stable (e.g., when the primary network is disconnected from the primary interface), the network router 20 may move communication to the backup interface, such that the backup transmission line is used for communication with the network switch 30. The network router 20 may move communication back to the primary transmission line when the primary interface is stable. Accordingly, even when the primary interface is not stable, Bill and Mary may communicate with the network router 20, for example, accessing information on the Internet.

Figure 2:
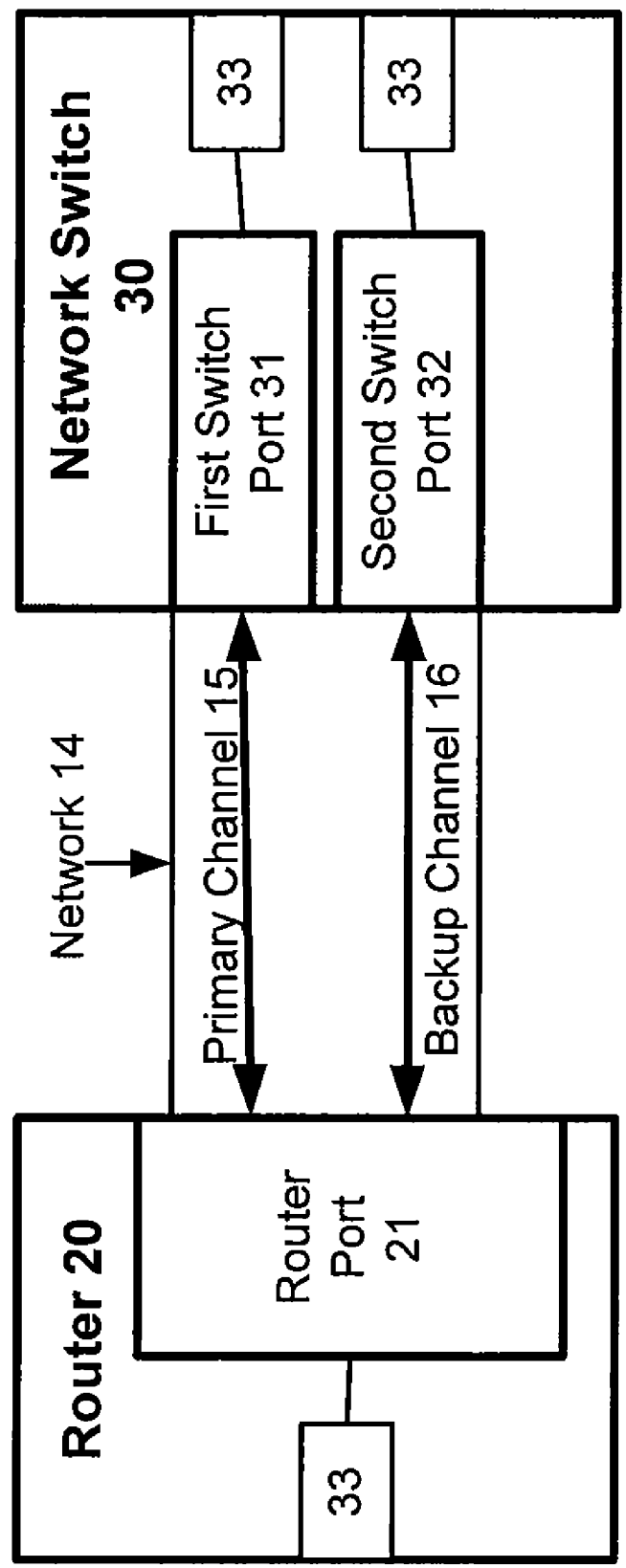
FIG. 2 illustrates one embodiment of a network router coupled with a network switch.

The networks 13, 14 may be transmission lines, network segments, communication channels, communication networks, or communication cablings. As shown in FIG. 2, the network 14 may include a primary channel 15 and a backup channel 16. The primary channel 15 and backup channel 16 may be copper cables, optical fibers, other communication cablings, or any combination thereof. For example, if the primary channel 15 is a copper cable, then the backup channel 16 may be an optical fiber. In another example, if the primary channel 15 is a fiber optic, then the backup channel 16 may be a copper cable. In another example, if the primary channel 15 is a copper cable, then the backup channel 16 may be a copper cable as well. In the illustration above, the primary transmission line is the primary channel 15 and the backup transmission line is the backup channel 16. The primary transmission line in the illustration above may be a copper cable and the backup transmission line may be an optical fiber.

The primary channel 15 and backup channel 16 may include connectors that connect the primary channel 15 and backup channel to the network router 20 and network switch 30. For example, in the illustration above, the primary transmission line (e.g., a copper cable) may include a RJ45 Ethernet connector at one or both ends, and the backup transmission line (e.g., an optical fiber) may include a connector at one or both ends of the optical fiber that may be plugged into a small form-factor pluggable (SFP) module.

The network 17 may be a service provider (SP) network, Internet Protocol (IP) network, Internet SP network, Voice over Internet Protocol (VoIP) network, or other network for communication. For example, in the illustration above, the network 17 is an IP network that connects to the Internet. In another example, the network 17 may be used to communicate with another communication network 10.

As shown in FIG. 2, the network router 20 may include a router port 21 that is operable for communication with the network switch 30. Additional, different, or fewer components may be provided. For example, the network router 20 may include one or more additional ports 33 for communicating with other devices, such as other network switches, servers, or communication devices connected to the network 17. The one or more additional ports 33 may be communicatively coupled with the router port 21.

The network router 20 may be a router, computer, server, open system interconnection (OSI) layer 3 switch, or other device for routing and forwarding messages. For example, the network router 20 may be a Cisco 76xx Router or Cisco 8xx Router that is operable to route messages between the network switch 30 and the network 17. In another example, the network router 20 is operable to automatically determine when a primary interface and/or a backup interface is stable or not stable. The network router 20 may automatically move the communication from a non-stable interface to a stable interface. Alternatively, or additionally, the communication may be moved from the backup interface to the primary interface when the primary interface is stable and/or when the backup interface is not stable. One benefit of moving communication back and forth between the primary interface and backup interface is that the network router 20 may provide automatic Ethernet failover and failback to the communication devices 40*a*, 40*b*.

As used herein, a stable interface may be an interface that is active and not flapping. A non-stable interface is an interface that is inactive or flapping.

Figure 3:
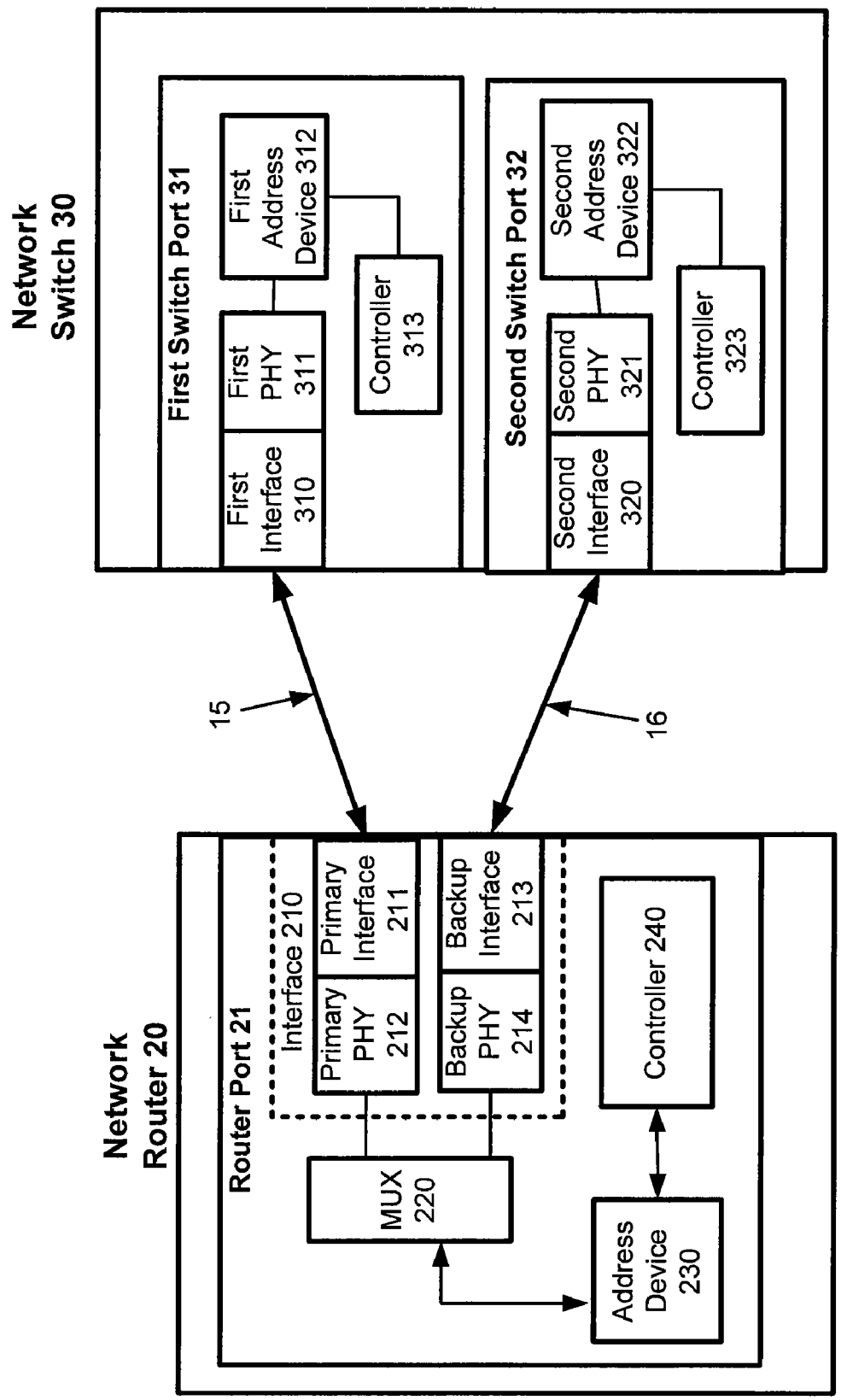
FIG. 3 illustrates embodiments of a router port and switch ports.

As shown in FIG. 3, the router port 21 includes a port interface 210, a multiplexor 220, an address device 230, and a controller 240. Additional, different, or fewer components may be provided.

The port interface 210 may include a primary interface 211, a primary PHY 212, a backup interface 213, and a backup PHY 214. The primary interface 211 and backup interface 213 may be interfaces that connect or are operable to connect to the primary channel 15 and backup channel 16. The primary interface 211 and backup interface 213 may be links for receiving connectors. For example, the primary interface 211 may include an RJ45 module for receiving a RJ45 connector, and the backup interface 213 may include a small form-factor pluggable (SFP) module. The primary interface 211 may communicate with the primary channel 15, and the backup interface 213 may communicate with the backup channel 16. The primary PHY 212 and the backup PHY 214 are physical mediums. The primary PHY 212 couples the primary interface 211 with the multiplexor 220. The backup PHY 214 couples the backup interface 213 with the multiplexor 220.

The primary PHY 212 and the backup PHY 214 are used to couple a link layer device, such as the address device 230, with a physical medium, such as the primary channel 15 and the backup channel 16. The primary PHY 212 and the backup PHY 214 may include a Physical Coding Sublayer (PCS) and a Physical Medium Dependent (PMD) layer. The PCS encodes and decodes the data that is transmitted and received. The purpose of the encoding is to make it easier for the receiver to recover the signal.

The multiplexor 220 may be operable to perform multiplexing and/or demultiplexing. The multiplexor 220 may combine the communication from the primary PHY 212 and the backup PHY 214 into one or more signals for communication to the address device 230 or router port controller 240. The multiplexor 220 may be used to route information received at the primary interface 211 and/or backup interface 213 to the controller 240. One benefit of using the multiplexor 220 may be that only a single address device 230 and a single router port controller 240 are necessary for the router port 21. Although the router port 21 may communicate using two channels (e.g., the primary channel 15 and the backup channel 16), the router port 21 only needs a single physical address and a single router port controller 240. In addition, switching communication from the primary interface 211 to the backup interface 213 (or, vice versa) may be more efficient and cost effective since only a single address device 230 and a single controller 240 are needed.

The address device 230 may be a media access control (MAC) device or other device that includes a physical address for the router port 21. The physical address may be used to communicate with the network switch 30. The physical address may be a unique identifier that indicates the physical location of the address device 230. For example, the address device 230 may be a MAC device that provides a MAC address. The address device 230 may be disposed outside of the router port controller 240 (as shown in FIG. 3), or integrated with (e.g., disposed in) the controller 240. For example, the MAC address may be hard-coded in the controller 240.

Figure 4:
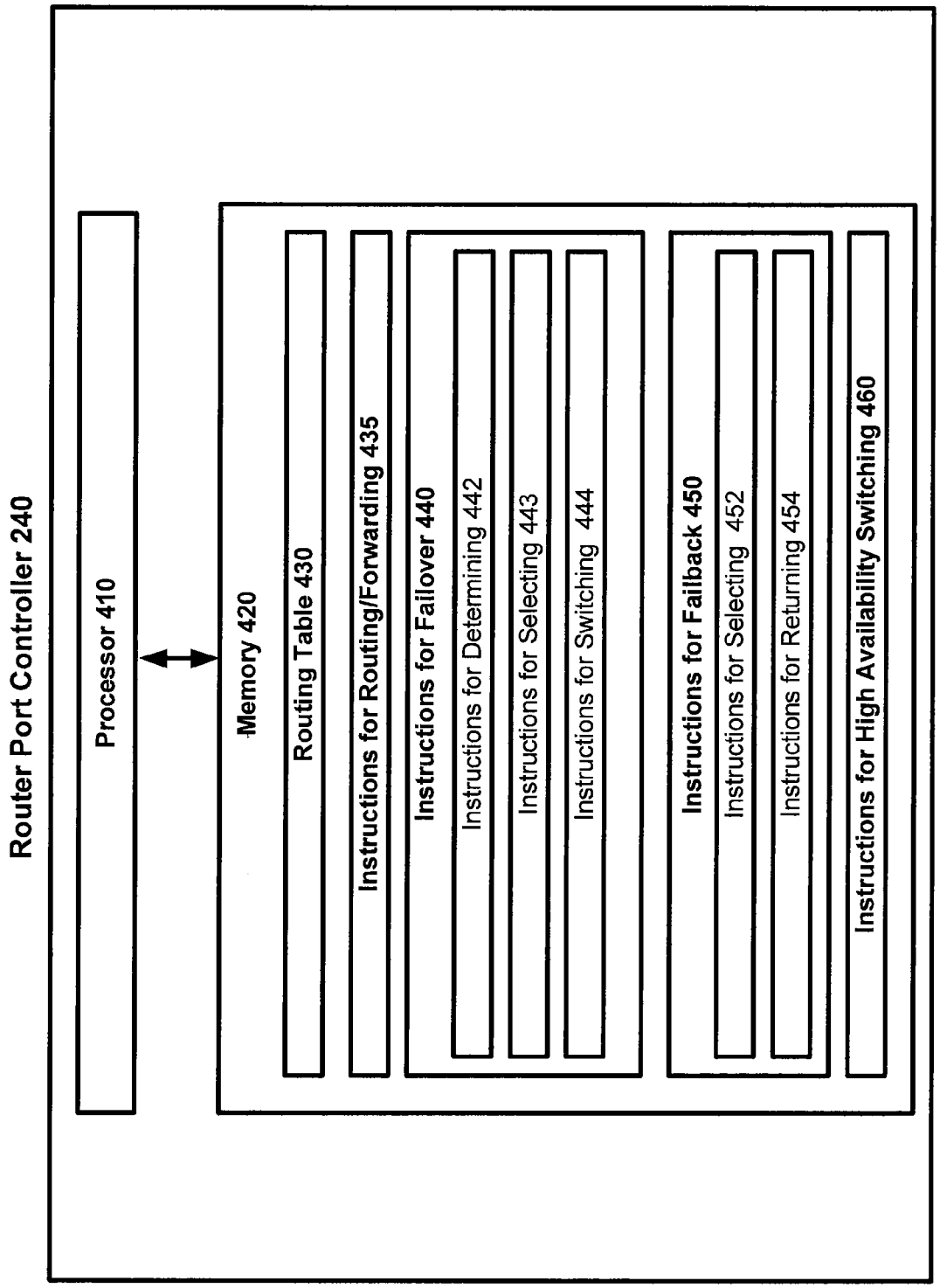
FIG. 4 illustrates one embodiment of the router port controller.

FIG. 4 shows a controller 240. The controller 240 includes a processor 410 and a memory 420. The controller 240 may include additional, different, or fewer components. For example, the processor 410 may be connected to a remote memory, and thus, the controller 240 may not include memory 420. In another example, as discussed above, the controller 240 may include the address device 230.

The processor 410 may be a general processor, digital signal processor, application specific integrated circuit, field programmable gate array, analog circuit, digital circuit, combinations thereof, or other now known or later developed processor. The processor 410 may be a single device or a combination of devices, such as associated with a network or distributed processing. Any of various processing strategies may be used, such as multi-processing, multi-tasking, parallel processing, remote processing, or the like. The processor 410 is responsive to instructions stored as part of software, hardware, integrated circuits, firmware, micro-code or the like.

The processor 410 is operable to communicate with the network switch 30, the one or more communication devices 40a, 40b, and/or one or more communication devices connected to the network 17. To communicate, the processor 410 may transmit and/or receive information, such as messages, signals, or other data.

The processor 410 is operable to route or forward information. When the processor 410 receives information, the processor 410 may examine the received information and determine a final destination for the received information. The final destination may be determined based on the examination and/or a routing table 430, which may be stored in memory 420. The processor 410 may transmit the received information to the final destination. Alternatively, or additionally, the processor 410 may perform translations of protocols between different networks.

The processor 410 may select a primary interface 211 and/or a backup interface 213 for communicating with the network switch 30. The primary interface 211 may be a preferred interface, which is connected to a preferred network, such as the primary channel 15. A preferred interface may be an interface that a customer or provider prefers. The preference may be predetermined and stored in memory or determined based on stability of the interfaces. Alternatively, or additionally, there may be no preference or preference may be randomly selected. The backup interface 213 may be an interface used for backing up the preferred interface.

The processor 410 is operable to determine whether the selected interface is stable. Determining whether the selected interface is stable includes determining whether the selected interface is active (or, has been active or will likely become active), counting the number of transitions of energy for the selected interface in a first transition count window, comparing the number of transitions to a random transition threshold, determining whether the selected interface is active or inactive at the end of a second transition count window, or any combination thereof.

As used herein, the number of transitions of energy relates to the number of times the energy state on the primary PHY 212 and/or backup PHY 214 changes from an active state to an inactive state. For example, if energy is not detected on the primary PHY 212, then the energy state of primary PHY 212 is inactive. However, if energy is detected on the primary PHY 212, then the energy state of primary PHY 212 is active.

Figure 5A:
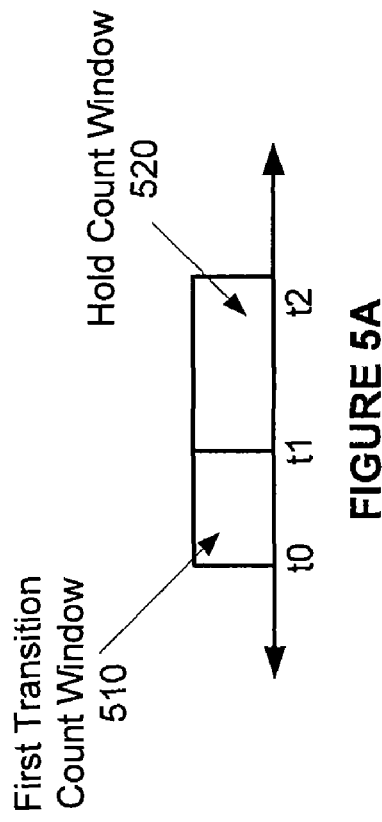
FIG. 5A illustrates one embodiment of the timing used to determine whether a selected interface is stable.
Figure 5B:
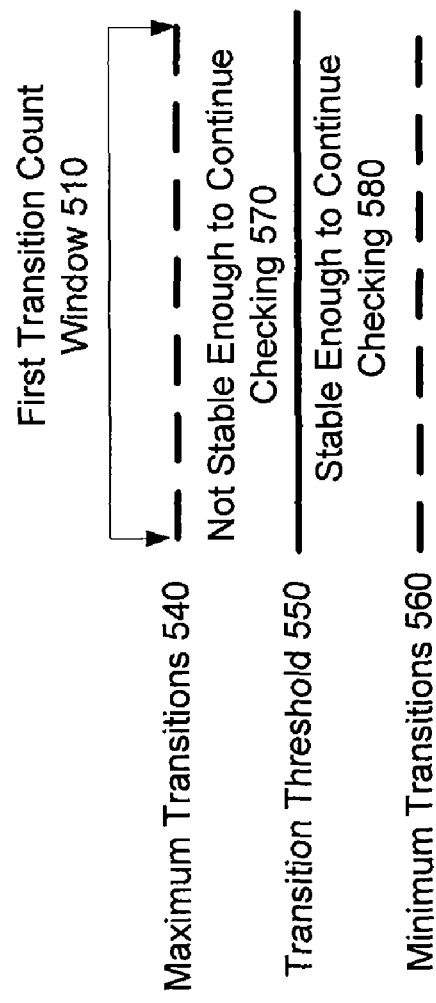
FIG. 5B illustrates one embodiment of a randomly selected transition threshold.

As shown in FIGS. 5A and 5B, the processor 410 may randomly select a time duration of a first transition count window 510 and a transition threshold 550. A transition threshold may be selected that is between the maximum number of transitions 540 within the first transitions count window 510 and the minimum number of transitions 560 within the first transition count window 510. For example, if each transition takes 100 milliseconds and the time duration of the first transition count window 510 (e.g., from t0 to t1) is a randomly selected time duration, such as 5 seconds, then the maximum possible transitions 540 would be fifty (50) transitions (e.g., (5*1000)/100) and the minimum possible transitions 560 would be ten (10) transitions. Picking the random number between ten (10) and fifty (50) provides forty (40) possible numbers. Accordingly, if the routers are connected back to back, as shown in FIG. 2, the probability of picking the same time is very low and hence lowering the probability of picking the wrong media and ending up in an infinite loop. Accordingly, the transition threshold is a random number between 10 and 50 transitions, for example, 25 transitions.

The processor 410 may use a timer to determine the first transition count window 510, as shown in FIG. 5. The transition count window 510 may have a randomly selected or predefined time duration. For example, as shown in FIG. 5, the time duration of the first transition count window may be from time t0 to time t1. The time duration of the first transition count window may be a random time duration, such 3-9 seconds. However, the time duration of the first transition count window 510 may be greater or less than this exemplary range. At the end of the first transition count window 510, the processor 410 may stop the timer and determine the number of transitions. The time duration of the first transition count window 510 may be fixed, such as sequentially counting for different non-overlapping windows, or may be a moving window, such as counting for the most recent transitions.

The processor 410 may count the number of transitions during the first count window 510 and compare the number of counted transitions to the transition threshold 550. As shown in FIG. 5B, if the number of counted transitions is greater than or equal to the transition threshold 550, then the selected interface is determined to be not stable enough to continue checking the selected interface 570. In other words, when the number of counted transitions is greater than or equal to the transition threshold 550, the selected interface is flapping. Accordingly, the selected interface may not be stable enough to use for communication. However, if the number of counted transitions is less than the transition threshold 550, then the selected interface is determined to be stable enough to continue checking 580 whether the selected interface is stable.

As shown in FIG. 5A, the processor 410 may determine whether the primary interface 211 and/or backup interface 213 have an active state or an inactive state at the end of a hold count window 520 (e.g., from t1 to t2). For example, the processor 410 may determine whether the primary interface 211 and/or backup interface 213 have an active state or an inactive state at time t2. The time duration of the hold count window 520 may be shorter, longer, or the same as the time duration of the first transition count window 510.

The processor 410 is operable to determine when selected interface is active ("UP") or inactive ("DOWN"). For example, the selected interface has an active state (e.g., UP) when energy is detected on the corresponding PHY (e.g., PHY 212 or PHY 214). The primary interface 211 and/or backup interface 213 are considered to have an inactive state (e.g., DOWN) when energy is not detected on the corresponding PHY (e.g., PHY 212 or PHY 214).

As used herein, the selected interface may be determined to be stable when the number of counted transitions is less than the randomly selected transition threshold and the selected interface is active at the end of the hold count window 520. The selected interface may be determined to be not stable when the selected interface is inactive before or during the first transition count window or the selected interface is inactive at the end of the hold count window. The selected interface is determined to be flapping when the number of counted transitions is greater than or equal to the randomly selected transition threshold 550. Flapping may occur when an interface on the network router 20 or network switch 30 has a hardware failure that will cause the network router 20 to determine that the primary interface 211 and/or the backup interface 213 is alternately UP and DOWN. Flapping may be caused by pathological conditions (e.g., hardware errors, software errors, configuration errors, intermittent errors in communications links, or unreliable connections) within the network 10 which cause information to be repeatedly advertised and withdrawn.

The processor 410 is operable to move communication from a primary interface 211 to a backup interface 213 when the primary interface 211 is inactive or not stable. Moving the communication from a primary channel 15 to a backup channel 16 may be referred to as failover. Moving the communication may include transferring communication to a stable interface. In one example, as shown in FIG. 3, when primary interface 211 is inactive or not stable, the processor 410 begins communication with the network switch 30 across the backup channel 16. The processor 410 may transmit information to the second address device 322, for example, through the second interface 320 and backup PHY 321.

One benefit of moving the communication to a stable interface may be that the network router 20 and network switch 30 may still communicate when the primary interface 211 is inactive or flapping. This provides redundancy in the communication. For example, in the illustration above, when the primary transmission line between the network router and network switch is disconnected for maintenance, Mary may still have access to the Internet using the backup transmission line. The failover may be automatic such that the performance of maintenance does not require manual reconfiguration.

In one embodiment, the processor 410 may determine whether the backup interface 213 is stable before moving communication. Determining whether the backup interface 213 is stable may include determining whether the backup interface 213 is active and/or stable. One benefit of checking the backup interface 213 before moving the communication may be that the unnecessary movement of communication may be prevented. Additional backup interfaces may be provided, such that failover may be to any backup and a backup may failover to another backup.

The processor 410 is operable to perform failback. Failback includes returning the communication back to the primary channel 15 from the backup channel 16. Returning the communication may include moving the communication or transferring the communication to a primary interface 211. The communication may be returned to the primary channel 15, for example, when the backup channel 16 is inactive or flapping, the primary channel 15 is stable, or as a rule.

The processor 410 is operable to select the primary interface 211 or the backup interface 213 for communication with the network switch 20. For example, based on whether the primary interface 211 and/or backup interface 213 are active, inactive, stable, or not stable, the processor 410 may select an interface for communication. Selection may include reading a switching table to determine whether to use the primary interface 211 or the backup interface 213 for communication. The network router 20 may use a switching table, such as Table 1, to select the interface used for communication with the network switch. Table 1 is based on the primary interface being the preferred interface.

TABLE 1

| Primary Interface | Backup Interface | Interface Selected |
|---|---|---|
| Stable | Stable | Primary Interface |
| Stable | Not Stable | Primary Interface |
| Not Stable | Stable | Backup Interface |
| Not Stable | Not Stable | Algorithm Picks the Interface |

As shown in Table 1, the processor 410 may select the primary interface 211 when the primary interface 211 is active, for example, UP. The processor 410 may automatically select a stable interface when the primary interface 211 is down or flapping. Selecting a stable interface may include selecting the backup interface 213 or another interface that is active. For example, as shown in Table 1, when the primary interface 211 is inactive or not stable, but the backup interface 213 is stable, the processor 410 may move communication to the backup interface 213. In another example, when the primary interface 211 and the backup interface 213 are inactive or not stable, the processor 410 may select an interface supported by another router.

Moving communication may include activating and deactivating the primary interface 211 and/or the backup interface 213. For example, if the primary interface 211 is inactive or flapping, the processor 410 may deactivate the primary interface 211 and activate the backup interface 213. In another example, when the primary interface 211 is active or becomes active, the processor 410 may deactivate the backup interface 213 and activate the primary interface 211. Activating an interface may include configuring the controller 240 and/or multiplexor 220 such that the controller 240 communicates the activated interface. For example, if the primary interface 211 is activated, then the controller 240 communicates with the primary interface 211. Deactivating an interface may include configuring the controller 240 and/or multiplexor 220 such that the controller 240 does not communicate with the deactivated interface.

The processor 410 is operable to perform high availability switching. High availability switching includes switching communication between two or more network routers 20 and/or network switches 30. As shown in FIG. 6A, two or more network routers 20 are configured so that when a first primary channel 15a and a first backup channel 16a, which are connected between a first router 20a and a network switch 30, are not stable, a second router 20b assumes the workload of both the first network router 20a and the second network router 20b. For example, when the first primary channel 15a and the first backup channel 16a are not stable, the second primary channel 15b or the second backup channel 16b may be used for communication. The first network router 20a may instruct the second network router 20b to begin communication with the network switch 30.

One benefit of high availability switching is that when the primary and backup interfaces 211, 213 of a first network router 20a are not stable, the network switch 30 may still communicate with the second network router 20b, such that the communication devices 40a, 40b may still communicate with the second network router 20b. In the illustration above, even if the network router goes down, Mary may still access the Internet using a second network router 20b. In addition, the second network router 20b has two levels for communication, for example, the second primary channel 15b and the second backup channel 16b.

In one embodiment, when the first network router 20a resumes operation, the second network router 20b may perform a failback, which returns the communication to normal operation, for example, using the first primary channel 15a or first backup channel 16a between the first network router 20a and the network switch 30.

Figure 6B:
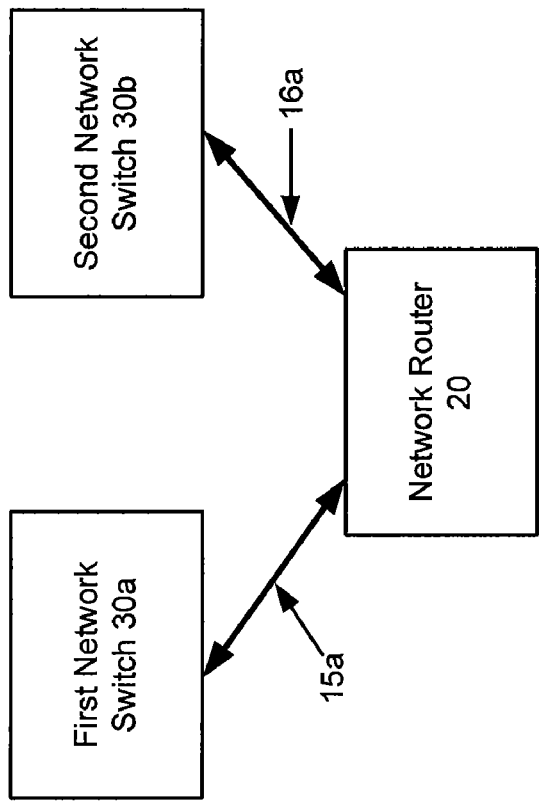
FIGS. 6A and 6B illustrate embodiments of high availability communication.
Figure 6A:
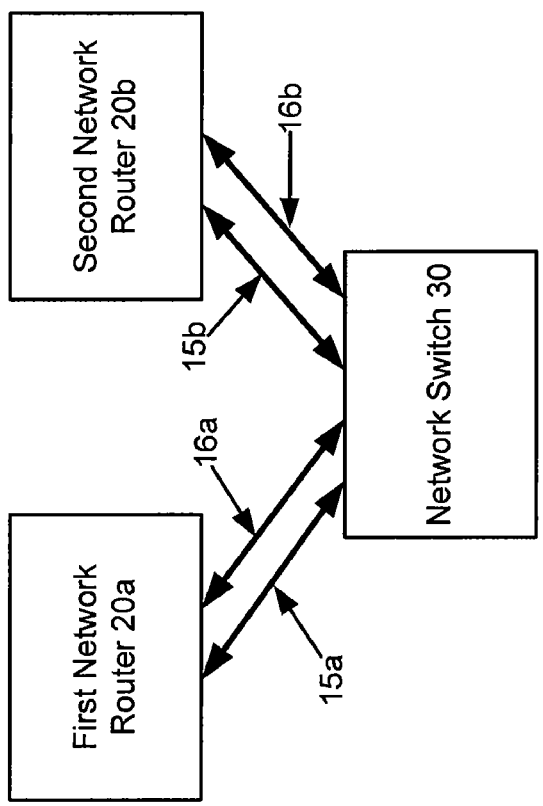

FIG. 6B shows an alternative embodiment of failover. As shown in FIG. 6B, when a router interface connected to a first primary channel 15a is not stable, the network router 20 may switch communication to a router interface connected to a first backup channel 16a. The first primary channel 15a may be connected to a first network switch 30a and the first backup channel 16a may be connected to a second network switch 30b.

FIG. 7A and FIG. 7B show alternative embodiments of high availability switching. As shown in FIGS. 7A and 7B, when the router interface connected to the first primary channel 15a is inactive or not stable, the first network router 20a may switch communication to a router interface connected to the first backup channel 16a. When the router interfaces connected to a first primary channel 15a and a first backup channel 16a are inactive or not stable, the first network router 20 may switch communication to a second primary channel 15b. When the interfaces connected to the first primary channel 15a, the first backup channel 16a, and the second primary channel 15b are inactive or not stable, the second network router 20 may switch communication to a router interface connected to the second backup channel 16b.

The memory 420 may be computer readable storage media. The computer readable storage media may include various types of volatile and non-volatile storage media, including, but not limited to, random access memory, read-only memory, programmable read-only memory, electrically programmable read-only memory, electrically erasable read-only memory, flash memory, magnetic tape or disk, optical media and the like. The memory 420 may be a single device or a combination of devices. The memory 420 may be adjacent to, part of, networked with and/or remote from the processor 410.

As shown in FIG. 4, the memory 420 may store a routing table 430. The routing table may include the routes (and in some cases, metrics associated with those routes) to particular network destinations. The routing table may include a topology of one or more networks. The memory 420 may store other lists, databases, or tables. For example, the memory 420 may store a forwarding table. The processor 410 may use a forwarding table to find a proper interface to which the input interface should send information.

The memory 420 may be a computer readable storage media having stored therein data representing instructions executable by the programmed processor 410. The memory 420 stores instructions for the processor 410. The processor 410 is programmed with and executes the instructions. The functions, acts, methods or tasks illustrated in the figures or described herein are performed by the programmed processor 410 executing the instructions stored in the memory 420. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

As shown in FIG. 4, the memory 420 may include instructions for routing/forwarding 435, instructions for failover 440, instructions for failback 450, and instructions for high availability switching 460. Additional, different, or fewer instructions may be provided.

The instructions for routing/forwarding 435 may be executed to route or forward information. For example, the instructions 435 may be executed to receive information from a communication device or a network switch, analyze the received information to determine a destination address, and route or forward the received information to the destination address. Analyzing the received information may include using a routing table to determine the destination address.

The instructions for failover 440 may be executed to switch communication from a primary interface to a backup interface, so that the network router and network switch may communicate when a primary interface is inactive or not stable. Switching communication may include moving communication from a first communication channel to a second communication channel. As shown in FIG. 4, the instructions for failover 440 may include instructions for determining 442, instructions for selecting 443, and instructions for moving communication to the selected interface 444. The instructions for determining 442 may be executed to determine whether an interface is stable, for example, by determining whether the interface is active, inactive, and/or flapping. The instructions for selecting 443 may be executed to select an interface for communication. The instructions 443 may be executed to select a preferred channel, a stable interface, an active interface, or a combination thereof. The instructions for switching 44 may be executed to move communication to the selected interface.

The instructions for failback 450 may be executed to return communication back to a primary channel from a backup channel. Returning the communication back to the primary channel may include moving communication to a primary interface. As shown in FIG. 4, the instructions for failback 450 may include instructions for selecting 452 and instructions for returning 454. The instructions for selecting 452 may be executed to select an active and/or stable interface.

The instructions for high availability switching 460 may be executed to move communication to a second network router or a second network switch. Moving communication may include transferring communication from a first network router or first network switch to a second network router or second network switch that has a stable interface.

As shown in FIG. 3, the network switch 30 may include a first switch port 31 and a second switch port 32. The network switch 30 may include additional, different, or fewer components. For example, the network switch 30 may include one or more ports that connect to the one or more communication devices 40. In another example, the network switch 30 may include additional ports that connect to the network router 20, for example, a third switch port may be provided. The third switch port may be connected to a backup network that may backup the first and second networks 15, 16. For example, if the interfaces connected to the first and second networks 15, 16 are inactive or not stable, then the backup network may be used for communication between the network router 20 and the network switch 30. In another example, as shown in FIG. 2, the network switch 30 may include one or more communication ports 33 that may be used to couple the communication devices 40 with the first switch port 31 and second switch port 32. In another example, the network switch 30 may include a buffer, which can hold data packets to be forwarded.

The network switch 30 is operable to allow different nodes, such as the one or more communication devices 40a, 40b, of the communication network 10 to communicate directly with one another in a smooth and efficient manner. The network switch 30 may work at Layers 1 (Physical) and 2 (Data Link) of the OSI Reference Model. The network switch 30 may analyze incoming data (e.g., voice data and/or text data) to determine a destination address for the incoming data. Based on that address, a transmission path is set up through a switching matrix between the incoming and outgoing physical communications ports and links.

As shown in FIG. 3, the first switch port 31 and second switch port 32 include first and second interfaces 310, 320; first and second PHYs 311, 321; first and second address devices 312, 322; and first and second controllers 313, 323. The first switch port 31 and second switch port 32 may include additional, different, or fewer components.

The first interface 310 and second interface 320 may be mechanical and/or electrical links that couple the primary and backup channels 15, 16 with the first and second PHYs 311, 321. For example, as shown in FIG. 3, the first interface 310 may couple the primary channel 15 with the first PHY 311, and the second interface 310 may couple the backup channel 16 with the second PHY 321.

The first address device 312 and second address device 322 may be media access control (MAC) devices or other devices that include a physical address for the first switch port 31 and second switch port 32. The physical address may be used to communicate with the network router 20. The physical address may be a unique identifier that indicates the physical location of the first address device 312 and the second address device 322. For example, the first address device 312 may be a MAC device that provides a MAC address. The first address device 312 may be disposed outside of the controller 313 (as shown in FIG. 3), or integrated with (e.g., disposed in) the controller 313. For example, the MAC address may be hard-coded in the controller 313.

The controllers 313, 323 may include processors and memories. The controllers 313, 323 may switch data received from one or more communication devices 40. For example, the controller 313 may receive incoming data from a first communication device, analyze the incoming data to determine a destination address (e.g., associated with a communication device 40a, 40b, the network router 20, or a communication device connected to the network switch 30), and transmit the incoming data to the network router 20.

The one or more communication devices 40 may be personal computers, servers, routers, network nodes, hubs, remote terminals, network switches, or other devices placed in a network. For example, in the illustration above, the laptop is a communication device 40 and the personal computer is a communication device 40. The one or more communication devices 40 may be operated by a user, for example, to browse the Internet or transmit messages to other communication devices.

FIG. 8 is a flowchart illustrating one embodiment of communication between a network router and a network switch. The method may include selecting a first network interface for communication, determining whether the selected network interface is stable, using the selected network interface for communication between the network router and the network switch. The method may also include, for example, selecting another interface and switching the communication to the other network interface when the selected network interface is inactive or not stable.

At block 810, a network router selects a first interface. The first interface may be a preferred interface, for example, connected to a preferred network, such as a copper cable or an optical fiber. The network router may select the first interface using a polling process or reading a preferred interface from memory. The polling process may be used to check the status of the interface.

In block 820, the network router determines whether the selected interface is stable. The network router may use a stability method, such as the method shown in FIG. 9, for determining whether the selected interface is stable. At block 910, as shown in FIG. 9, a first timer is started once communication is switched to the selected interface.

In one embodiment, the router may determine whether the selected interface is, was, or will likely be active, as shown in block 915. In other words, the router may determine if there is, was, or will likely have energy on the corresponding PHY. If the corresponding PHY does not have energy, then the selected interface may be inactive and the router may select another interface and switch communication to that interface, as shown in block 830 of FIG. 8. In an alternative embodiment, the router may determine if the selected interface is active prior to starting the first timer. In other words, the acts represented in block 915 may be performed prior to the acts represented in block 910.

At block 920, the router counts a number of transitions, for example, from UP to DOWN and/or DOWN to UP on the selected interface during a first transition count window. The selected interface is UP when energy is detected on the selected interface, for example, on the PHY corresponding to the selected interface. The selected interface is DOWN when energy is not detected on the selected interface, for example, on the PHY corresponding to the selected interface. At the end of the first transition count window, the router may stop the timer and determine the number of transitions.

As shown in block 930, the router may compare the number of counted transitions, which were counted during the first transition count window, to a randomly selected transition threshold. The randomly selected transition threshold may be less than the maximum number of transitions for the first transition count window and greater than the minimum number of transitions for the first transition count window. For example, when the number of counted transitions is below the randomly selected transition threshold, the selected network may be determined to be stable enough to continue to finish checking whether the selected interface is stable. However, when the number of transitions is greater than or equal to the randomly selected transition threshold, the selected interface may be determined to be not stable. Accordingly, the router may select another interface and switch communication to the selected interface, as shown in block 830. In an alternative embodiment, the randomly selected transition threshold may be a predefined or preselected transition threshold.

At block 940, when the number of counted transitions is below the randomly selected transition threshold, a second timer is started. The second timer is used to define a hold count window. The time duration of the hold count window 520 may be longer than the time duration of the first transition count window. As shown at block 950, the router may determine whether the selected interface is inactive (e.g., UP) or active (e.g., DOWN) at the end of the hold count window. For example, if the selected network is inactive at the end of the hold count window, then the selected interface is determined to be not stable and communication is switched to another network, as shown in block 830 of FIG. 8. However, if the selected network is active at the end of the hold count window, then the selected interface is determined to be stable and used to communicate with the network switch, as shown in block 840 of FIG. 8. The selected interface may be continuously or periodically checked to determine whether the selected interface is stable.

In one alternative embodiment, if the selected interface is not the preferred interface, the network router may periodically poll the preferred interface. The polling may take place before, during, or after the network router determines whether the selected interface is stable. If the preferred interface is UP, the network router may switch communication to the preferred interface. Communication may be switched back to the preferred interface, even when the backup interface is UP. One benefit of automatically reverting back to the preferred interface may be that the preferred interface and preferred network may be used as much as possible. In addition, the network administrator may not be required manually switch the communication back to the preferred network.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A router comprising:
a primary interface of a router port, the primary interface on a first physical layer for communication over a primary network segment;
a backup interface of the router port, the backup interface on a second physical layer for communication over a backup network segment;
a processor coupled to the primary interface and the backup interface; and
a memory in communication with the processor, the memory including computer code executable with the processor, wherein the computer code is configured to:
determine whether the first physical layer of the primary interface is stable based on energy state changes of the first physical layer during a first time duration, and whether the primary interface is active at an end of a hold count window of a second time duration, wherein the primary interface is stable when the primary interface is usable to exchange information over the primary network segment;
communicate using the primary interface of the router port when the primary interface is determined to be stable; and
communicate using the backup interface of the router port when the primary interface is determined to be not stable.

2. The router of claim 1, where the primary network segment includes a copper cable and the primary interface is configured to receive a connector coupled with said copper cable, and
wherein the backup interface includes an optical fiber and the backup interface is configured to receive a connector coupled with said optical fiber.

3. The router of claim 1, where the computer code is also configured to:
monitor the primary interface after determining that the primary interface is not stable, where monitoring includes checking whether the primary interface is stable;
determine when the primary interface becomes stable; and
switch communication from the backup interface to the primary interface, such that the primary interface is used to communicate.

4. The router of claim 1, where the computer code is configured to communicate with a network switch using the primary interface when the primary interface is determined to be stable, and communicate with the network switch using the backup interface when the primary interface is determined to be not stable.

5. The router of claim 1, where the computer code is also configured to determine whether the backup interface is stable, the backup interface being stable when the backup interface may be used to exchange information over the backup network segment.

6. The router of claim 1, where the computer code is also configured to move communication to another router when the primary interface and backup interface are not stable.

7. The router of claim 1, where the primary interface and backup interface are connected to a multiplexor that is coupled with the processor, the processor being associated with an address device having a physical address.

8. A method comprising:
selecting a first router interface and first physical layer for communication via a router port, the selected first router interface communicates using a first network segment;
determining whether the selected first router interface is stable based on energy state transitions at the first physical layer;
using the selected first router interface to communicate with a network switch via the router port when the selected first router interface is stable;
determining whether a second router interface is stable based on energy state transitions at a second physical layer when the selected first router interface is not stable; and
moving communication to the second router interface and the second physical layer of the router port when the second router interface is stable,
where determining whether the selected first router interface is stable includes counting a number of transitions of energy on the selected first router interface during a transition count window and comparing the number of transitions to a randomly selected transition threshold, the transition count window having a first randomly selected time duration.

9. The method of claim 8, where determining whether the selected first router interface is stable includes determining that the selected first router interface is stable when the number of transitions is less than the randomly selected transition threshold and the selected first router interface is active at an end of a hold count window having a second randomly selected time duration, the second randomly selected time duration being longer than the first randomly selected time duration.

10. The method of claim 8, further comprising:
monitoring the first router interface to determine when the first router interface is stable; and
moving communication via the router port back to the first router interface when the first router interface is stable.

11. The method of claim 8, further comprising switching communication to another router when the first router interface and second router interface are not stable.

12. The method of claim 8, further comprising using a multiplexor to communicate with the first router interface and second router interface, such that a processor may communicate with the first router interface and second router interface.

13. The method of claim 8, wherein the first router interface is coupled with a copper cable and the second router interface is coupled with an optical fiber.

14. A method, comprising:
selecting a first router interface associated with a first physical layer of a router port for communication with a network switch, the selected first router interface being operable to communicate with the network switch using a first network segment;
counting a number of transitions on the first physical layer of the selected first router interface, the number of transitions being counted during a transition count window having a first time duration;
determining whether the selected first router interface is stable based on the number of transitions and whether the selected first router interface is active at an end of a hold count window of a second time duration; and
moving communication with the network switch to a second router interface associated with a second physical layer of the router port when the selected first router interface is not stable based on the number of transitions, the second router interface being operable to communicate with the network switch using a second network segment.

15. The method of claim 14, where the second time duration is longer than the first time duration of the transition count window.

16. The method of claim 14, wherein a time duration of the second transition count window and a time duration of the first transition count window are randomly selected.

17. The method of claim 14, further comprising:
determining whether the second router interface is stable; and
moving communication with the network switch to a second router when the first router interface and the second router interface are not stable.

18. The router of claim 1, where the router port, the primary interface, and the backup interface have a same physical address.

19. The method of claim 8, wherein determining whether the selected first router interface is stable based on energy state transitions at the first physical layer occurs during a first time duration and further comprises determining whether the primary interface is active at an end of a hold count window of a second time duration.

* * * * *